(12) United States Patent
Raymond et al.

(10) Patent No.: US 9,457,830 B2
(45) Date of Patent: Oct. 4, 2016

(54) RECREATIONAL BOBSLEIGH

(71) Applicants: Nicolas Raymond, Piedmont (CA); Mercier Raymond, Piedmont (CA)

(72) Inventors: Nicolas Raymond, Piedmont (CA); Mercier Raymond, Piedmont (CA)

( * ) Notice: Subject to any disclaimer, the term of this patent is extended or adjusted under 35 U.S.C. 154(b) by 0 days.

(21) Appl. No.: 14/852,497

(22) Filed: Sep. 12, 2015

(65) Prior Publication Data

US 2016/0075364 A1  Mar. 17, 2016

(30) Foreign Application Priority Data

Sep. 12, 2014 (GB) .................................... 1416195.4

(51) Int. Cl.
*B62B 17/00* (2006.01)
*B62B 17/06* (2006.01)

(52) U.S. Cl.
CPC ............. *B62B 17/063* (2013.01); *B62B 17/00* (2013.01)

(58) Field of Classification Search
CPC ....... B62B 13/00; B62B 13/02; B62B 13/06; B62B 13/08; B62B 15/00; B62B 15/007; B62B 17/00; B62B 17/06
USPC .............................. 280/15–19, 18.1, 21.1, 27
See application file for complete search history.

(56) References Cited

U.S. PATENT DOCUMENTS

| | | | | |
|---|---|---|---|---|
| 2,829,902 A | * | 4/1958 | Stocker ................... | B62B 15/00 280/18 |
| 3,169,779 A | * | 2/1965 | Haab ....................... | B60B 39/12 280/18 |
| 3,335,440 A | * | 8/1967 | Beakbane ............... | B63B 1/041 280/18.1 |
| D215,506 S | * | 10/1969 | Jones ..................... | D12/11 |
| 3,579,682 A | * | 5/1971 | Wood ..................... | B63B 35/81 280/18 |
| 3,635,490 A | * | 1/1972 | Demaree ................. | B62B 13/06 280/18 |
| D238,564 S | * | 1/1976 | Skillius .................. | D12/10 |
| 3,948,536 A | * | 4/1976 | Konrad ................... | B62B 13/00 280/18 |
| 4,077,638 A | * | 3/1978 | Lund ...................... | B62B 13/10 280/18 |

(Continued)

FOREIGN PATENT DOCUMENTS

| | | | |
|---|---|---|---|
| DE | 3503142 | * | 8/1985 |
| DE | 9301845 | * | 4/1993 |

(Continued)

OTHER PUBLICATIONS

Machine translation of DE202006011670—printed from espace.net.com on Mar. 11, 2016.*

*Primary Examiner* — Joseph Rocca
*Assistant Examiner* — Travis Coolman

(57) ABSTRACT

A bobsleigh for recreational use has a monolithic body having a nose section, two sides, and an underside. Each side towards the rear of the bobsleigh has a push handle. The nose section, the sides; and the underside defining an interior seating pit comprised of a long seat which forms an integral part of the underside. The underside has a plurality of grooves for directional control. The underside defines a hollow volume. Inside the pit, the grooves and space in between the grooves define a floor area. The seat has a top portion defining a seating surface, two sides, a front portion; and a rear portion thereof.

9 Claims, 6 Drawing Sheets

(56) References Cited

U.S. PATENT DOCUMENTS

| | | | |
|---|---|---|---|
| 4,199,163 A * | 4/1980 | Nelson | B62B 13/00 280/18.1 |
| 4,405,140 A | 9/1983 | Stevens | |
| 4,524,984 A * | 6/1985 | Axelson | B62B 15/00 280/18 |
| 4,561,664 A * | 12/1985 | Cashmere | A63C 5/03 280/18 |
| 4,666,171 A * | 5/1987 | Sellers | B62B 15/00 280/18 |
| D356,756 S * | 3/1995 | Kilk | 280/18.1 |
| D366,633 S * | 1/1996 | Pasin | D12/11 |
| 5,645,289 A * | 7/1997 | Harmon | B62B 15/00 280/19 |
| 5,879,214 A * | 3/1999 | Bentley | B62B 13/02 280/22.1 |
| D422,939 S * | 4/2000 | Fireman | D12/11 |
| 6,641,446 B1 * | 11/2003 | Bentley | B63C 9/32 280/19 |
| D520,092 S * | 5/2006 | Peterson | D21/770 |
| D520,093 S * | 5/2006 | Peterson | D21/770 |
| 7,520,009 B1 * | 4/2009 | Heck | A61G 1/01 128/870 |
| 2002/0024188 A1 * | 2/2002 | Gu | B60F 3/0007 280/16 |
| 2006/0273533 A1 * | 12/2006 | Fireman | B62B 13/08 280/18 |

FOREIGN PATENT DOCUMENTS

| | | |
|---|---|---|
| DE | 19542277 | 5/1997 |
| DE | 202006011670 | * 10/2006 |
| DE | 102006035554 | * 9/2007 |
| EP | 0277461 | 8/1988 |
| EP | 0277461 | * 8/1998 |
| WO | WO9718118 | * 5/1997 |

* cited by examiner

RECREATIONAL BOBSLEIGH

FIELD OF THE INVENTION

The present invention relates generally to sports equipment but more particularly to a bobsleigh for recreational use.

BACKGROUND OF THE INVENTION

The Olympic sport of bobsleigh is a popular event but outside of people training for the Olympics, there are very few people practicing this sport. It requires a long and very expensive slide and extensive training. Moreover, the bobsleigh itself is quite expensive which doesn't make the sport very attractive to people looking for a leisure activity to do on week ends.

SUMMARY OF THE INVENTION

In view of the foregoing disadvantages inherent in the known devices now present in the prior art, the present invention, which will be described subsequently in greater detail, is to provide objects and advantages which are:

To provide for an inexpensive polymer bobsleigh that can be use on slopes normally used for activities such as snowrafting, snowtubing, etc.

In order to do so, the invention comprises a monolithic body having a nose section, two sides, and an underside. Each side towards the rear of the bobsleigh has a push handle. The nose section, the sides; and the underside defining an interior seating pit comprised of a long seat which forms an integral part of the underside. The underside has a plurality of grooves for directional control. The underside defines a hollow volume. Inside the pit, the grooves and space in between the grooves define a floor area. The seat has a top portion defining a seating surface, two sides, a front portion; and a rear portion thereof.

The rear portion ends above ground level so as to define a rear opening extending integrally from the hollow volume, and a curve at the bottom of the rear portion forming a lip member defining a lift handle.

A plurality of winglets are located on the sides with one winglet on each of the sides of a front portion of the bobsleigh and one winglet for each of the sides of a rear portion of the bobsleigh.

A pull rope is used for pulling the bobsleigh, and the pull rope is equipped with a pulling spring located in the hollow volume.

A plurality of nipples wherein each the nipple is connected to the underside through a dedicated hole.

A fixed rudder is used for keeping the bobsleigh on course.

The push handle consist of a substantially circular opening.

Safety straps are connected to an upper part side of the seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiment of the invention.

DETAILED DESCRIPTION

Figure 1:
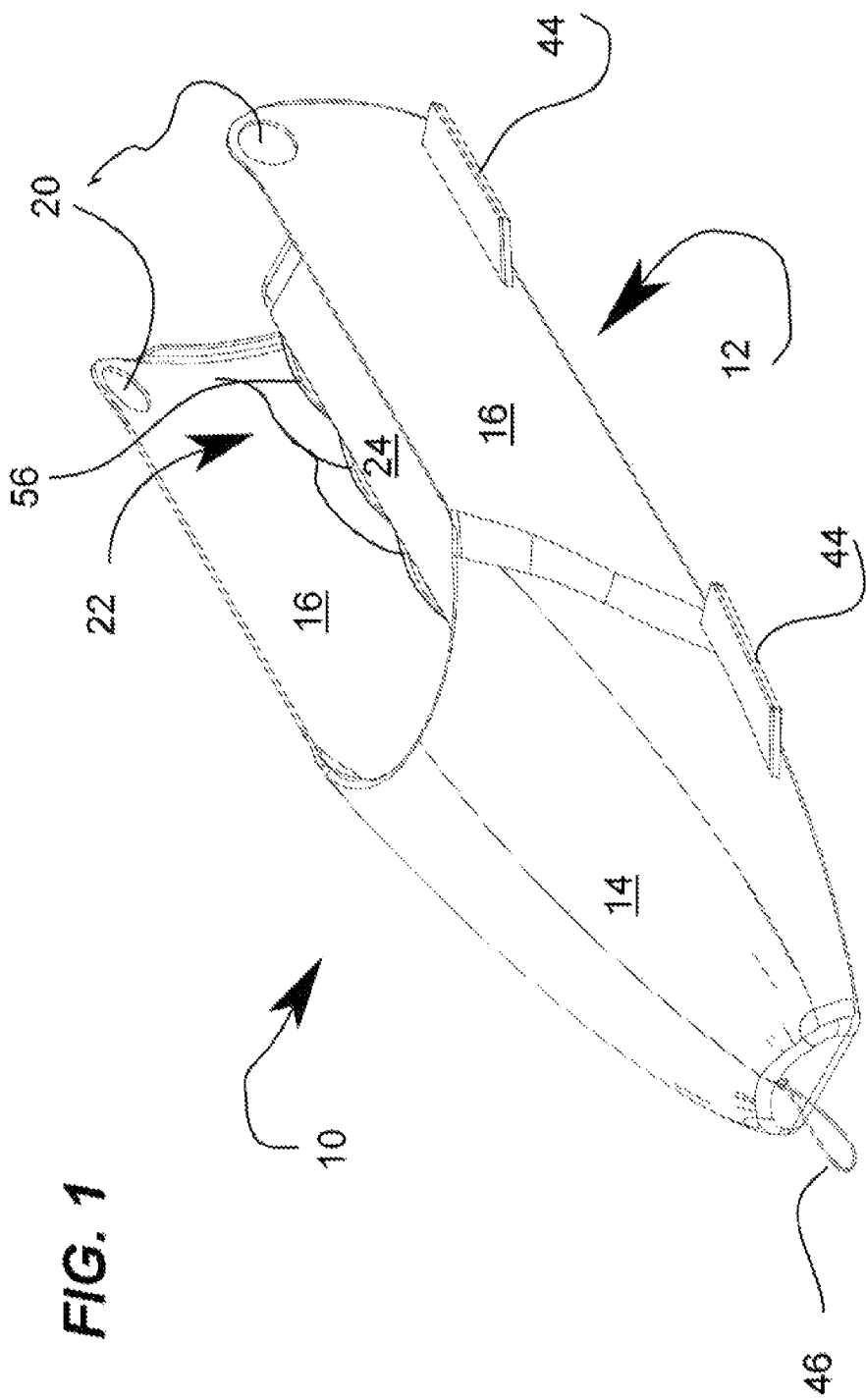
FIG. 1 Isometric view of the invention.
Figure 2:
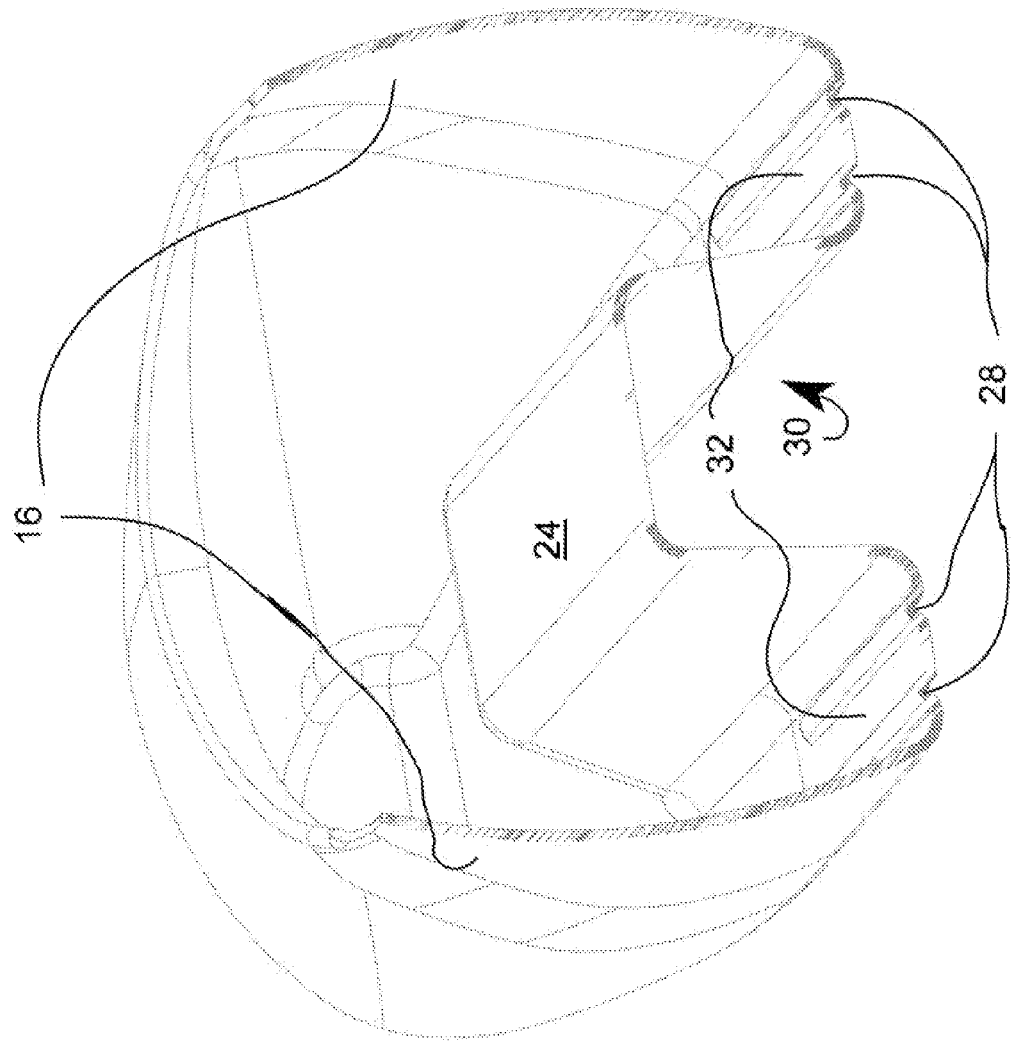
FIG. 2 Cutaway showing a midsection of the invention.
Figure 3:
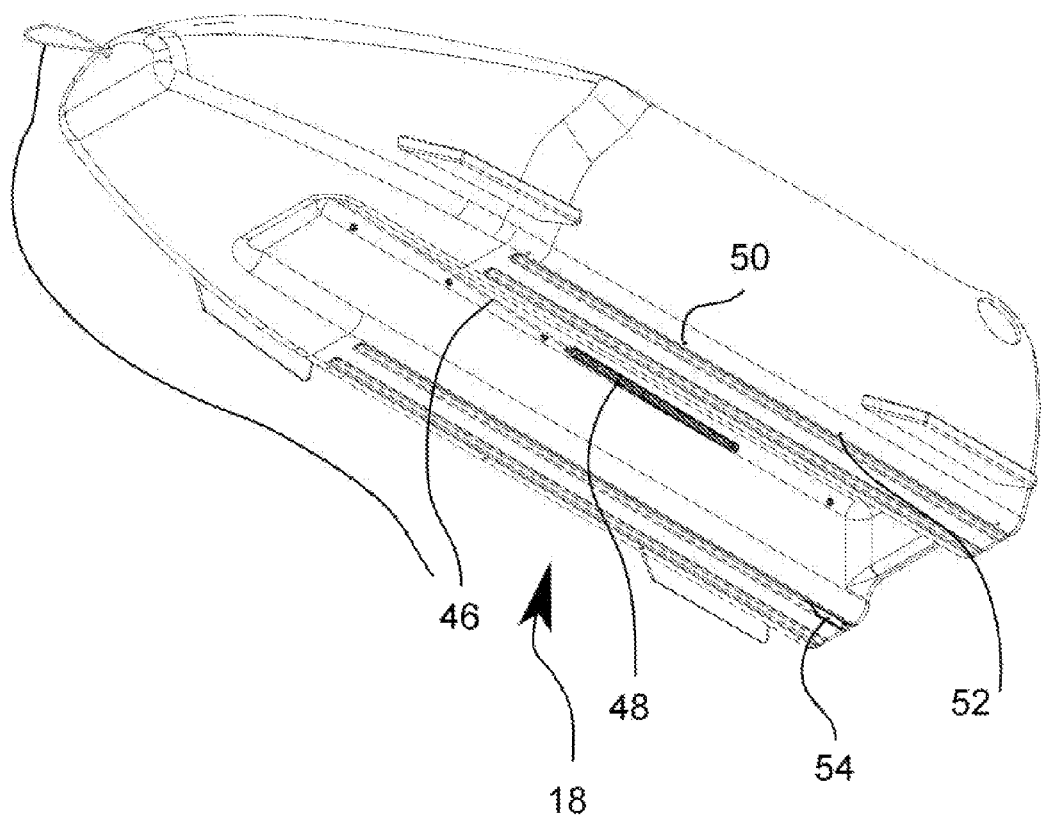
FIG. 3 Isometric view of the underside the bobsleigh.
Figure 4:
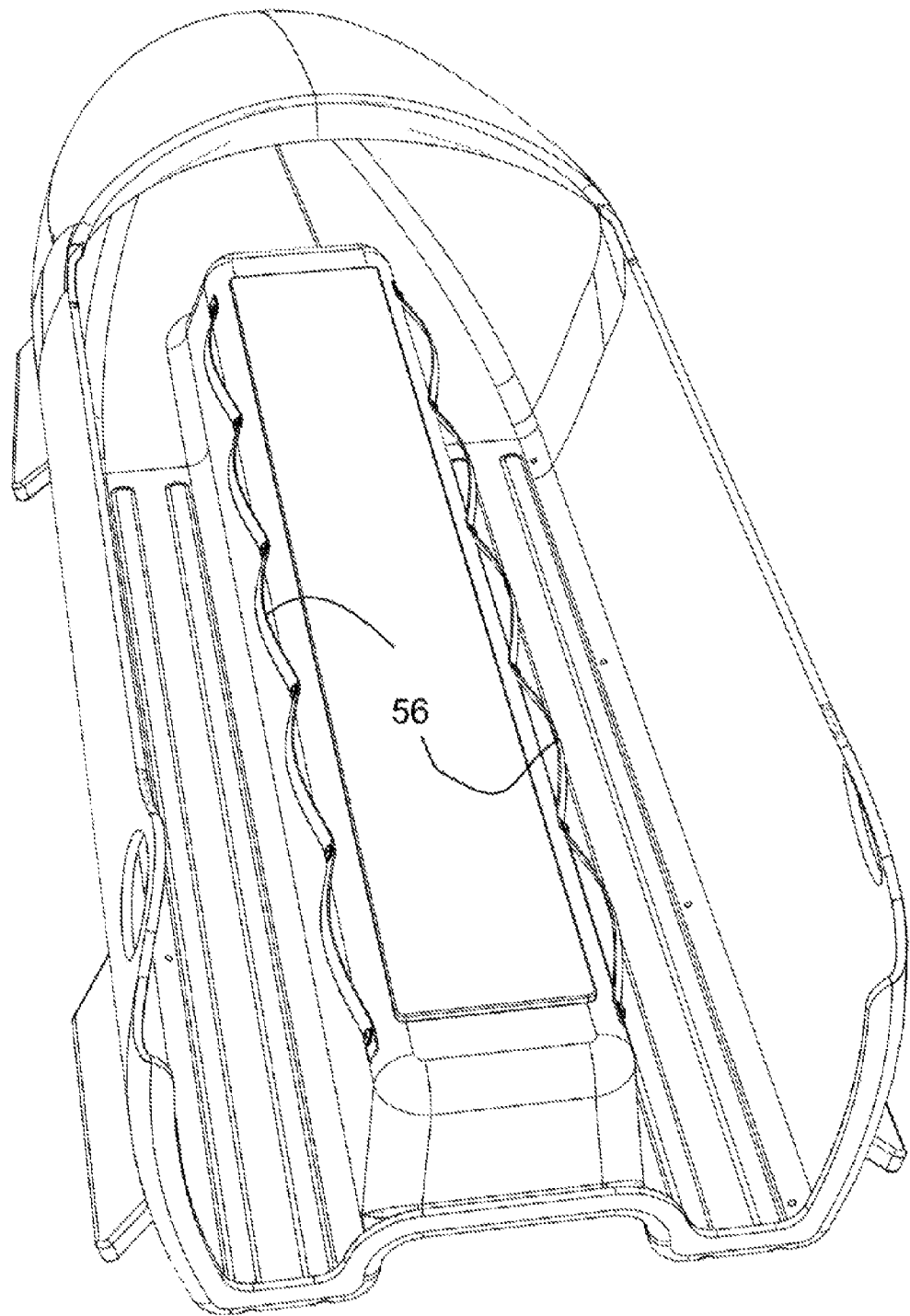
FIG. 4 Isometric view from the top showing the interior.
Figure 5A:
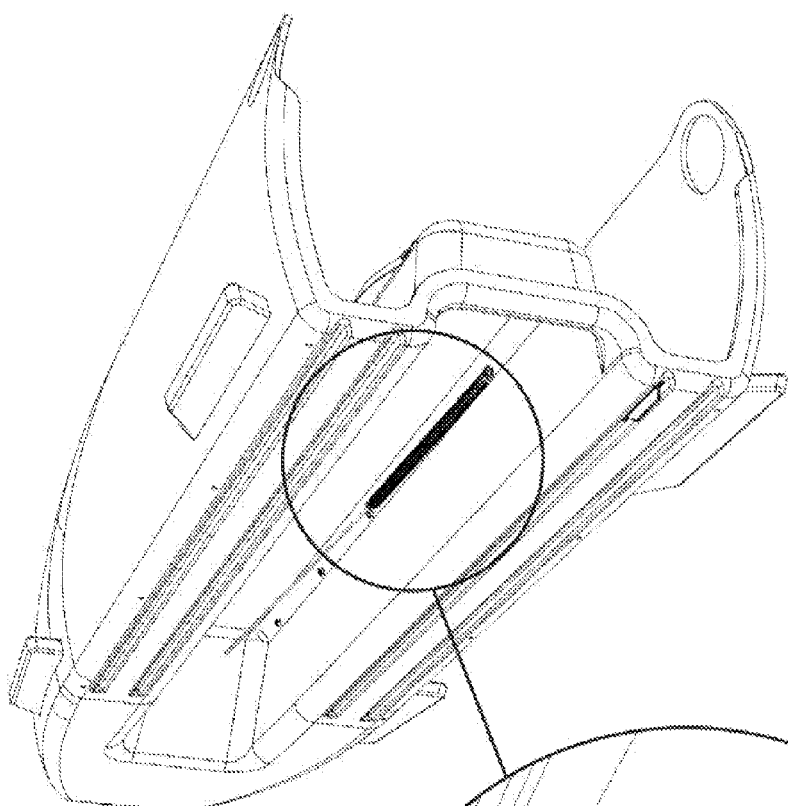
FIGS. 5a-b Isometric bottom view and close up of the spring.
Figure 5B:
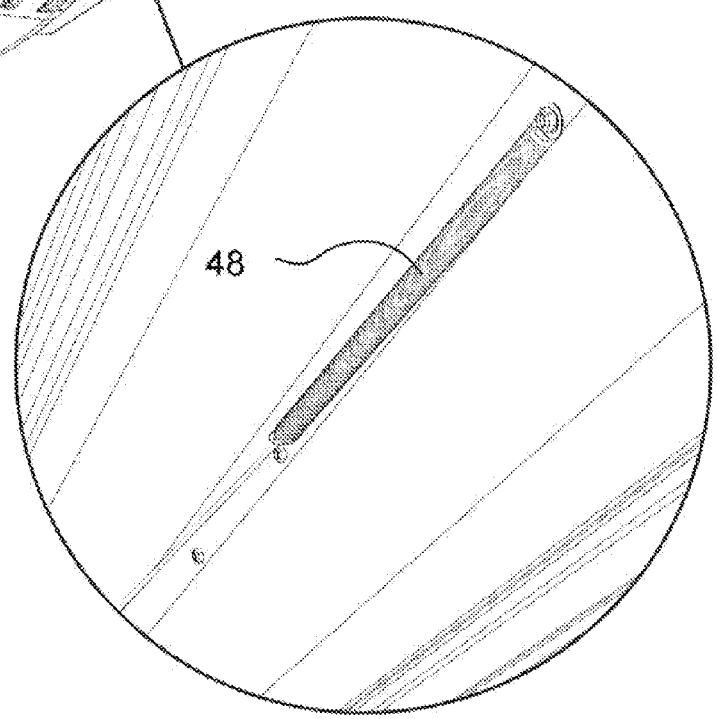
Figure 6:
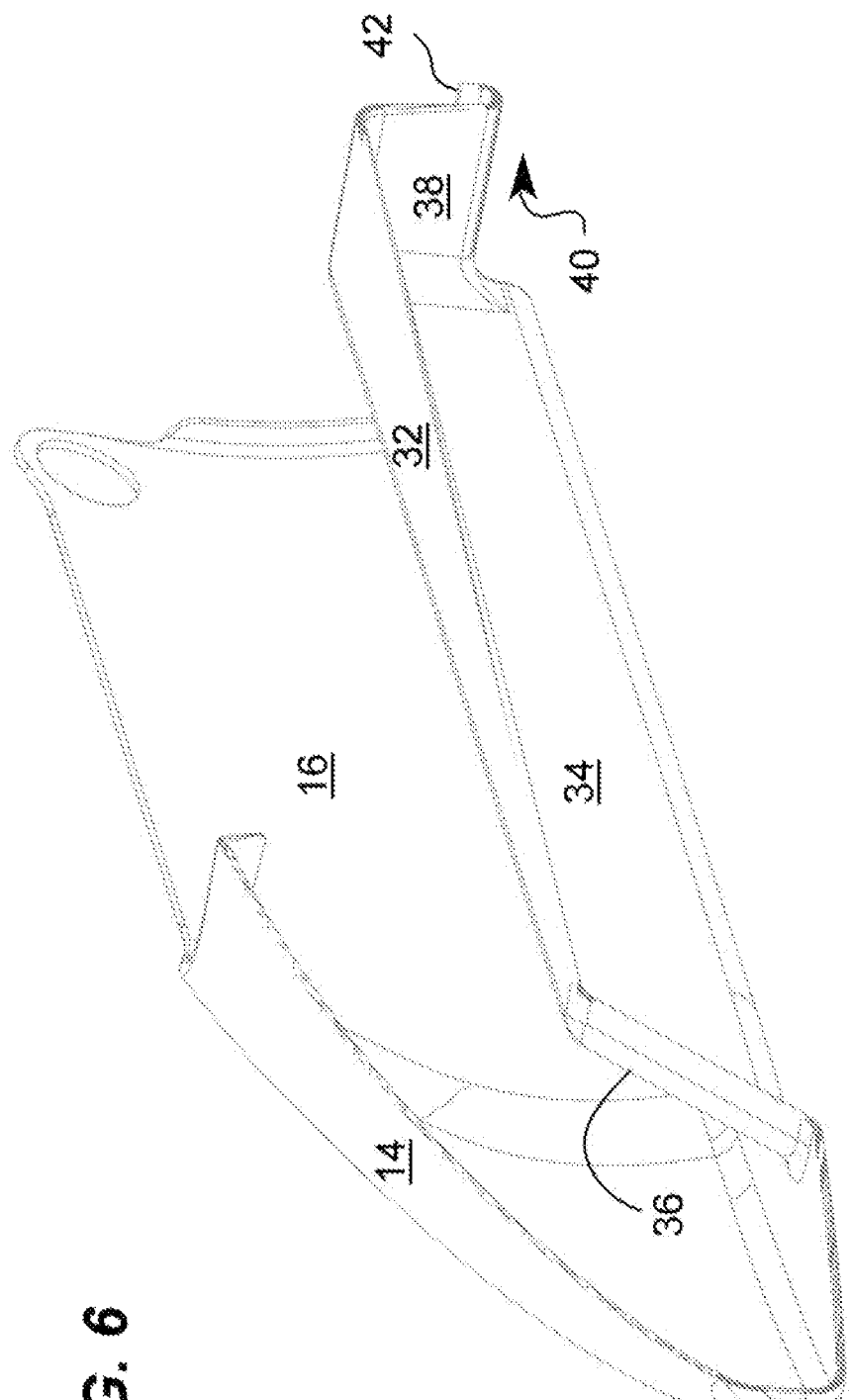
FIG. 6 Cutaway isometric view.

A recreational bobsleigh (10) has a body (12) having a nose section (14), two sides (16), and an underside (18). The rear part of the sides (16) each have a push handle (20) in the shape of a round opening. The nose section (14), sides (16), and underside (18) define an interior seating pit (22) comprised of a long seat (24) which forms an integral part of the underside (18).

The underside (18) has a plurality of grooves (28) for directional control.

Also, on the underside (18), a hollow volume (30) reduces the area of contact with the snow, so as to reduce friction while at the same time creating the shape of the seat (24). Inside the pit (22), the grooves (28) and the space in between define a floor area (32).

The seat (24) has a top portion (32)—or seating surface—two long sides (34) a front portion (36) and a rear portion (38) all from a monolithic structure. The rear portion (38) ends short of the floor level so as to define a rear opening (40) to allow for snow to be evacuated from the hollow volume (30). A curve at the bottom of the rear portion (38) creates a lip member which can serve as a lift handle (42) for lifting of moving the bobsleigh (10). Safety straps (56) connected to the upper part side of the seat (24) secure the users.

To prevent barreling of the bobsleigh (10), a plurality of winglets (44) are located on the sides of the bobsleigh (10). Typically two towards the front and two towards the back.

A pull rope (46) is used for pulling the bobsleigh (10) and is equipped with a pulling spring (48) located in the hollow volume (30). The pulling spring (48) pulls the pull rope (46) tightly against the nose section (14) so that it does not drag under the bobsleigh (10).

To control the speed according to snow conditions, a plurality of nipples (50) can be added through holes (52) made on the underside (18) so as to add friction. Typically, those nipples (50) consists of bolt heads from bolts bolted to the underside (18).

A fixed rudder (54) further helps in keeping the bobsleigh on course (prevents spinning or side to side swaying).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A recreational bobsleigh comprising a monolithic body having a nose section, two sides, and an underside; each side towards a rear of said bobsleigh having a push handle; said nose section, said sides, and said underside defining an interior seating pit comprised of a long seat which forms an integral part of said underside; said underside having a plurality of grooves for directional control; said underside defining a hollow volume; inside said pit, said grooves and space in between said grooves define a floor area; said seat having a top portion defining a seating surface, two sides, a front portion; and a rear portion thereof; a plurality of nipples wherein each said nipple is connected to said underside through a dedicated hole.

2. The recreational bobsleigh of claim 1 wherein a plurality of winglets are located on said sides.

3. The recreational bobsleigh of claim 2 wherein there is one winglet on each of said sides of a front portion of said bobsleigh and one winglet for each of said sides of a rear portion of said bobsleigh.

4. The recreational bobsleigh of claim 1 wherein a pull rope is used for pulling said bobsleigh.

5. The recreational bobsleigh of claim 4 wherein said pull rope is equipped with a pulling spring located in said hollow volume.

6. The recreational bobsleigh of claim 1 wherein said rear portion ending above ground level so as to define a rear opening extending integrally from said hollow volume, and a curve at a bottom of said rear portion forming a lip member defining a lift handle.

7. The recreational bobsleigh of claim 1 wherein safety straps are connected to an upper part side of said seat.

8. The recreational bobsleigh of claim 1 wherein a fixed rudder is used for keeping said bobsleigh on course.

9. The recreational bobsleigh of claim 1 wherein said push handle comprises of a substantially circular opening.

\* \* \* \* \*